United States Patent [19]

McDonough et al.

[11] Patent Number: 5,625,748

[45] Date of Patent: Apr. 29, 1997

[54] TOPIC DISCRIMINATOR USING POSTERIOR PROBABILITY OR CONFIDENCE SCORES

[75] Inventors: John W. McDonough, Brighton; Herbert Gish, Newton; Jan R. Rohlicek, Watertown; Kenney Ng, Boston; Phillippe Jeanrenaud, Arlington, all of Mass.

[73] Assignee: BBN Corporation, Cambridge, Mass.

[21] Appl. No.: 228,755

[22] Filed: Apr. 18, 1994

[51] Int. Cl.[6] .................................. G10L 5/06; G10L 9/00
[52] U.S. Cl. ...................... 395/2.6; 395/2.45; 395/2.47; 395/2.48; 395/2.49
[58] Field of Search ................................ 395/2.45, 2.47, 395/2.48, 2.49, 2.6

[56] References Cited

U.S. PATENT DOCUMENTS

| | | | |
|---|---|---|---|
| 4,718,094 | 1/1988 | Bahl et al. | 381/43 |
| 4,827,522 | 5/1989 | Matsuura et al. | 381/43 |
| 4,975,959 | 12/1990 | Benbassat | 381/41 |
| 5,418,951 | 5/1995 | Damashek | 395/600 |

OTHER PUBLICATIONS

Dixon, W.J. and Massey, F.J.; Introduction to Statistical Analysis, 1969, pp. 236–244.

Miller, L. G. and Corin, A.L., "A Structured Network Architecture for Adaptive Language Acquisition", Sep. 1992, pp. I–201 to I–204.

Primary Examiner—Allen R. MacDonald
Assistant Examiner—Indranil Chowdhury
Attorney, Agent, or Firm—Lappin & Kusmer LLP

[57] ABSTRACT

An improved topic discriminator includes an integrated speech recognizer or word and phrase spotter as part of a speech event detector, and a topic classifier trained on topic-dependent event frequencies. The event frequencies are determined from either or both transcribed data with a text event detector and untranscribed speech data with a speech event detector. In accordance with another aspect of the present invention, the phrase spotter is used to detect the presence of phrases without the need of parsing the output of a speech recognizer's hypothesized transcription. In accordance with another aspect of the invention, an improved technique is used to select a subset of the potential speech events on whose event frequencies the topic discrimination decision is made. Finally, in accordance with another aspect of the invention, an improved method of topic modeling is used to improve the performance of the topic discriminator.

22 Claims, 10 Drawing Sheets

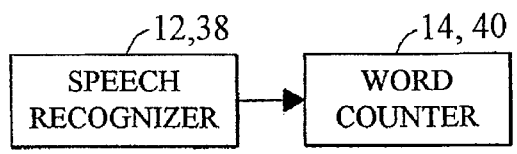
*FIG. 6A*
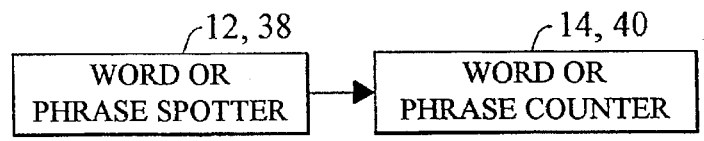
*FIG. 6B*
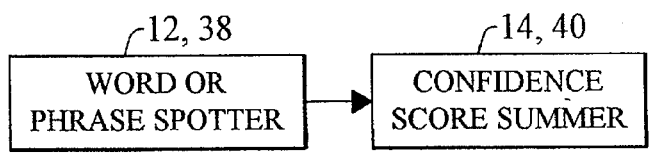
*FIG. 6C*
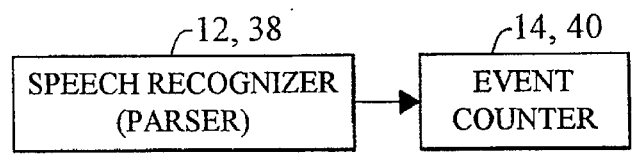
*FIG. 6D*
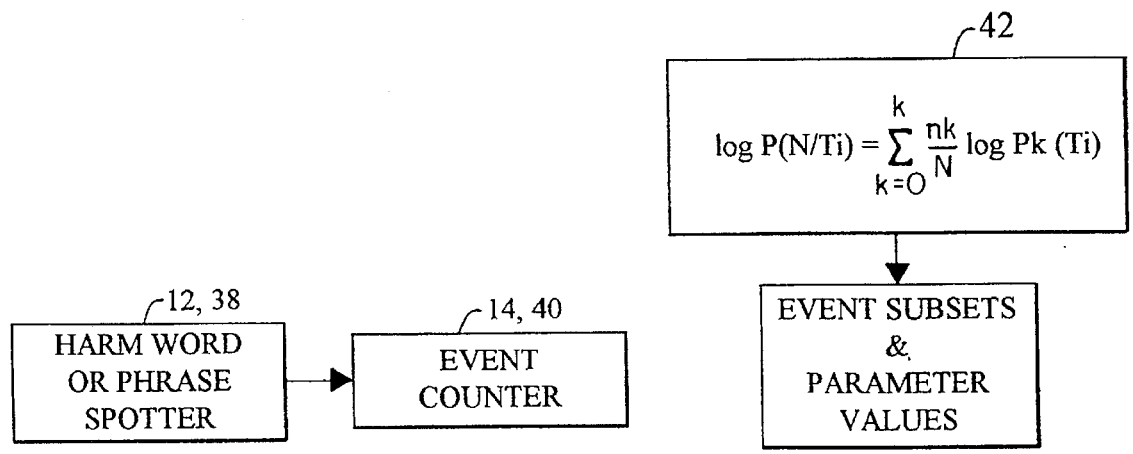
*FIG. 7*      *FIG. 8*

| TOPIC | RARE . . . FREQUENT | | | |
|---|---|---|---|---|
| 302 | | | | |
| 308 | | | | |
| . . . | | | | |
| 358 | | | | |

*FIG. 13A*

| TOPIC | RARE . . . FREQUENT | | | |
|---|---|---|---|---|
| INTEREST | | | | |
| OTHER | | | | |

*FIG. 13B*

TOPIC DISCRIMINATOR USING POSTERIOR PROBABILITY OR CONFIDENCE SCORES

FIELD OF THE INVENTION

The present invention relates generally to speech recognition systems, and more particularly to an improved topic discriminator of a spoken message.

BACKGROUND OF THE INVENTION

A topic discriminator for spoken data is used to classify the data into one of a set of known topics or to discriminate between data belonging to a known topic from data belonging to other topics. The topic discrimination is usually performed using only features extracted from the speech data itself. Applications similar, but not identical, to topic discrimination have been disclosed previously in the art, and have been designated by terms such as "gisting", "topic identification", and as "automatic acquisition of language."

An example of a prior use of a speech topic discriminator includes classification of recordings of air-traffic-control dialogs by whether the flight is landing, taking off, or neither landing or taking off, as was described in Rohlicek, Ayuso et al. (1992) (J. R. Rohlicek and D. Ayuso, et al.; "Gisting Conversational Speech"; IEEE ICASSP; 1992; Volume II, pp. 113–116).

Implementing a topic discriminator generally involves a training cycle in which a human operator selects the topic categories of interest. Selected topics may be, for example, (1) the weather, (2) the arts, and (3) sports. As part of the training cycle, the operator also provides a set of recorded speech messages that exemplify each of the selected topic categories. In the above example, the operator would provide a set of recorded speech messages about the weather, a set of recorded speech messages about the arts, and a set of recorded speech messages about sports. The set of all the recorded speech messages used in training is generally known as a training corpus.

A training corpus is generally developed by recording speech samples of one or more people, as for example, where one or more people have been directed to speak about a specific topic (e.g., the weather). A good training corpus typically contains speech messages recorded from a large number of people. A training corpus may contain written transcripts of the speech messages, acoustically recorded speech messages, or both.

Once a topic discriminator has been provided with a training corpus, the discriminator attempts to determine which of the preselected topics is the most likely subject matter of each speech message received. In keeping with the above example, if a topic discriminator is provided with an input speech message, based on the determined content of the message the discriminator will attempt to recognize whether the determined subject matter of the input speech message is more similar to the subject matter of those speech messages of the training corpus in one of the categories than to the subject matter of those speech messages of the training corpus in the other categories.

Several approaches to topic classification have been attempted in the past. The basic approach to the problem has been to treat topic classification as a text classification problem with the text being created by a speech recognizer. For example, Farrell, et al., (K. Farrell, R. J. Mammone and A. L. Gorin; "Adaptive Language Acquisition Using Incremental Learning"; IEEE ICASSP; 1993; Volume I; pp. 501–504) have investigated the pairing of spoken phone messages with desired "actions". The actions considered are the routing of messages to one of several departments of a retail store. This system is based on a one-layer neural network whose connection weights are related to the "association" between a word known to the system, with each word represented by a node at the input layer of the neural network, and a desired action, each action being represented by a node at the output layer. While it is assumed that all possible actions are known, the system has the capacity to interactively learn new vocabulary words as it is being used by a customer. Using acoustic similarity measures between words spoken and the system's current vocabulary, an unknown word can be identified in an incoming message. The new word is then added to the vocabulary through the creation of a new input node and its association with the desired action is learned through an iterative training process. The training process attempts to increase the rate of learning for new words appearing in messages that were initially misclassified. This learning process, however, requires that the system be able to query the user as to the correctness of the action it proposes (e.g., "Would you like to be connected with the furniture department?"), and subsequently re-learn those messages which produce undesirable recommendations. Additionally, the system presently under discussion cannot be used in applications where the user speaks "naturally" or without making a special effort to be understood—it is dependent on each word being spoken in isolation. Related research is described in Gorin, et al. (A. L. Gorin, L. G. Miller and S. E. Levinson; "Some Experiments in Spoken Language Acquisition"; IEEE ICASSP; 1993; Volume I, pp. 505–508).

A system similar to that proposed by Farrell, et al., and Gorin, et al. and apparently motivated by it has been described by Rose, et al. (R. C. Rose, E. I. Chang and R. P. Lippmann; "Techniques for Information Retrieval from Voice Messages"; IEEE ICASSP; 1991, Volume I, pp. 317–320). The latter group proposed the use of a word spotting system in conjunction with a one-layer neural network classifier whose weights are trained to minimize classification error. This system uses the spotting score associated with each putative hit as an indication of the "accuracy" of a given event. Unlike the Farrell, et al. and Gorin, et al. system, however, it does not have the capacity to learn new words through interactive use.

J. R. Rohlicek and D. Ayuso, et al. (1992), supra; and Denenberg, et al. (L. Denenberg and H. Gish; "Gisting Conversational Speech in Real Time"; IEEE ICASSP; 1993, Volume II; pp. 131–134) have proposed and built a system for "gisting" conversational speech. The application to which this system was addressed was two-way communication between air traffic controllers and airplane pilots. The system attempts to determine approximately what the controller or pilot has said in each transmission; i.e., get the "gist" of the speech, defined as the flight scenario, such as take-off or landing, a given aircraft is in. This task is made tractable by the constrained nature of the dialogue between pilots and controllers. Typically each transmission must begin with a flight identification and then contain one or more instructions whose number is known in advance. For this reason, the word recognizer comprising one component of the gisting system is able to make use of finite state networks specifically designed to model each of a number of commonly occurring words and phrases; less commonly occurring words are not as explicitly modeled, but instead are represented by a phoneme or "filler" loop.

Message classification is performed in the gisting system by forming a binary vector representing each word or phrase present in a recognized utterance, which may well be errorful. This vector is taken as the input to a classification tree that has been previously constructed based on some amount of recognized training data. See Breimin, et al. (L. Breiman, J. H. Friedman, R. A. Olshen and C. J. Stone; "Classification and Regression Trees"; Wadsworth International Group, Belmont, Calif., 1984). The tree performs the desired classification based on an optimal set of "questions" about the absence or presence of sets of words and phrases. A variation on the basic approach attempts to reduce the effect of recognition errors by using for classification the N-best or most likely word sequences instead of only the single best.

Gillick, et al. (L. Gillick and J. Baker, et al.; "Application of Large Vocabulary Continuous Speech Recognition to Topic and Speaker Identification Using Telephone Speech"; IEEE ICASSP; 1993, Volume II, pp. 471-474) have developed a system for topic identification for conversational speech over the telephone, as provided by the NIST Switchboard Corpus. Because this system is intended to be used on general, unconstrained speech, it uses a large vocabulary and a bigram or stochastic "language" model. The system employs a set of "keywords" that are relevant to a given topic. These words are found by taking text transcripts, compiled by human transcribers, and building contingency tables for each possible keyword; a contingency table tabulates the number of conversations in which a given word appeared seldom or often and can be used as the basis of a hypothesis test as to whether the frequency of occurrence of a word is significantly different across two or more topics. The system of Gillick et al. also uses text transcripts to construct topic models, which in this case are unigram or multi-nomial models of topic-conditioned keyword-frequency. Topic classification is performed by running the large vocabulary word recognizer on an input speech message and scoring the resulting errorful transcript against each competing topic model-the conversation is classified as belonging to that topic whose model scores highest. In this system, no attempt is made to associate a score indicative of the accuracy of the recognizer output with any word or phrase; i.e., none of the statistics generated during the recognition process contribute to the subsequent topic classification process.

In summary, techniques for discrimination of naturally spoken speech messages by topic have been described in the prior art. Several simply use a speech recognizer to produce an hypothesized transcription of the spoken data which is then input to a text-based topic discrimination system trained only on correctly transcribed text. Rose et al (1991) use text training data but also incorporate some characteristics of their word spotter in the design of their topic discriminator.

Although the prior techniques may be applicable in certain situations, there are limitations that are addressed by the current invention. In particular, all the prior techniques require either transcribed speech data for training the topic discriminator, do not make use of a phrase spotter as a detector for events useful for topic discrimination, do not use word or phrase spotting confidence measure to improve performance, or require some sort of user feedback for training or during actual operation.

OBJECTS OF THE INVENTION

General objects of the present invention are to provide a topic discriminator which addresses situations for which the prior art is not applicable and to provide substantially improved topic discrimination performance relative to that possible using the prior art.

A more specific object of the present invention is to provide a topic discriminator capable of working when little or no transcribed training data is available for the topic modeling component of the discriminator.

Another specific object of the present invention is to address situations in which user feedback is undesirable or impossible, such as when using prerecorded speech data.

Yet another specific object of the present invention is to provide an improved topic discriminator, which can use the occurrence of complex phrases, for example any dollar amount, in addition to words or simple word sequences as input events on which to base topic discrimination decisions.

Still another object of the present invention is to improve performance of a topic discriminator by making direct use of confidence scores from a word or phrase spotter, rather than using binary detection decisions or hypothesized transcriptions, in the topic discriminator.

Another object for the present invention is to provide a means of determining a set of potential speech events to be detected by the speech event detector of a topic discriminator using transcribed training data if it is available.

SUMMARY OF THE INVENTION

These and other objects are provided by an improved topic discriminator that includes an integrated speech recognizer or word and phrase spotter as part of a speech event detector, and a topic classifier trained on topic-dependent event frequencies. The event frequencies are determined from either or both transcribed data with a text event detector and untranscribed speech data with a speech event detector.

In accordance with another aspect of the present invention, the phrase spotter is used to detect the presence of phrases without the need of parsing the output of a speech recognizer's hypothesized transcription.

In accordance with another aspect of the invention, an improved technique is used to select a subset of the potential speech events on whose event frequencies the topic discrimination decision is made.

Finally, in accordance with another aspect of the invention, an improved method of topic modeling is used to improve the performance of the topic discriminator.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not a restrictive or limiting sense, with the scope of the application being indicated in the claims.

BRIEF DESCRIPTION OF THE DRAWINGS

For a fuller understanding of the nature and objects of the present invention, reference should be had to the following detailed description taken in connection with the accompanying drawings in which the same reference numerals are used to indicate the same or similar parts wherein:

FIGS. 6A–6D show alternative approaches to determining the event frequencies by the event detectors shown in FIGS. 1 and 3;

FIG. 7 shows a preferred embodiment of the event detectors of FIGS. 1 and 3;

FIG. 8 shows a preferred embodiment of a parametric probability model for determining at least a portion of the prescribed set of speech events representing the topic;

FIGS. 13A and 13B shows alternative types of contingency tables used for selecting keywords for use in a topic discriminator according to the invention.

DETAILED DESCRIPTION OF THE DRAWINGS

Figure 1:
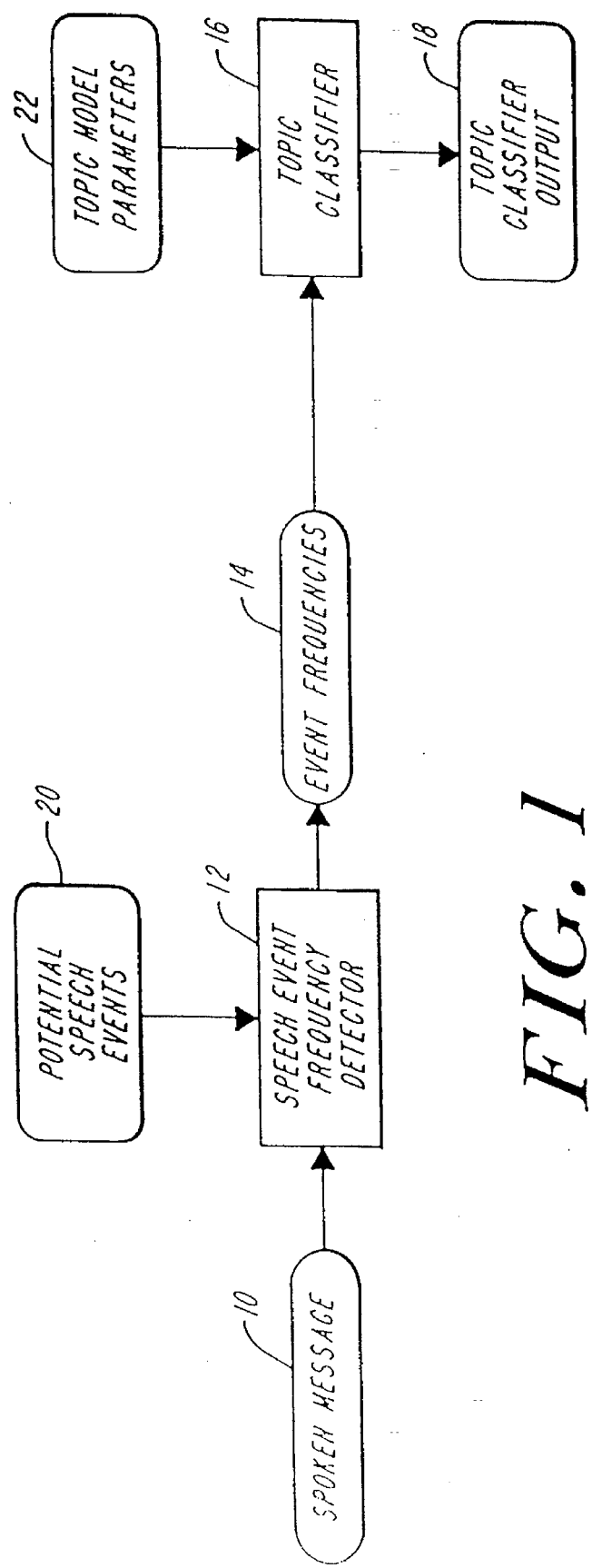
FIG. 1 is a block diagram of the preferred embodiment of the topic discriminator of the present invention for use in processing new spoken data.
Figure 2A:
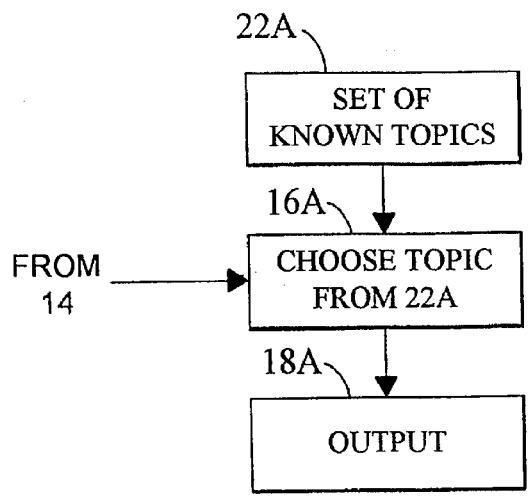
FIGS. 2A–2C show various types of outputs that can be provided by the topic classifier of FIG. 1.
Figure 2B:
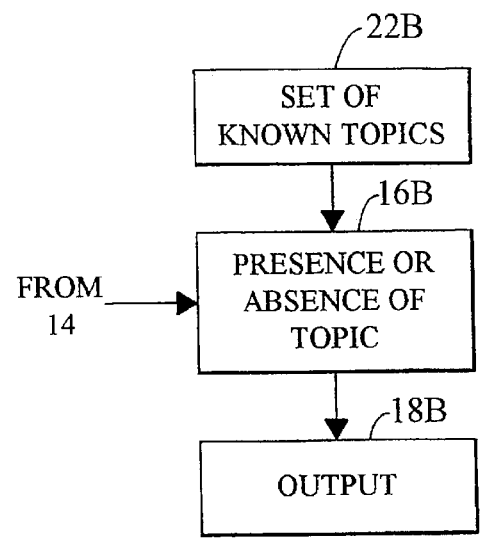
Figure 2C:
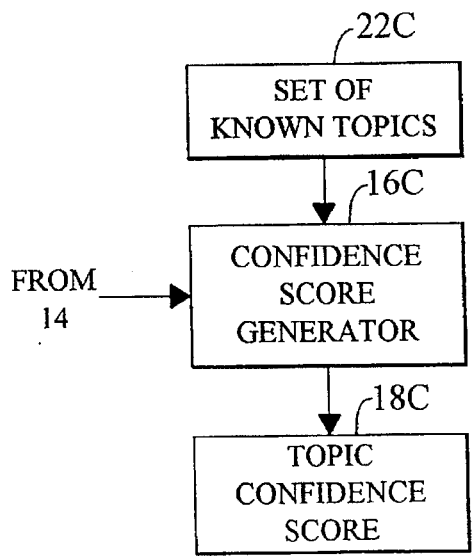
Figure 3:
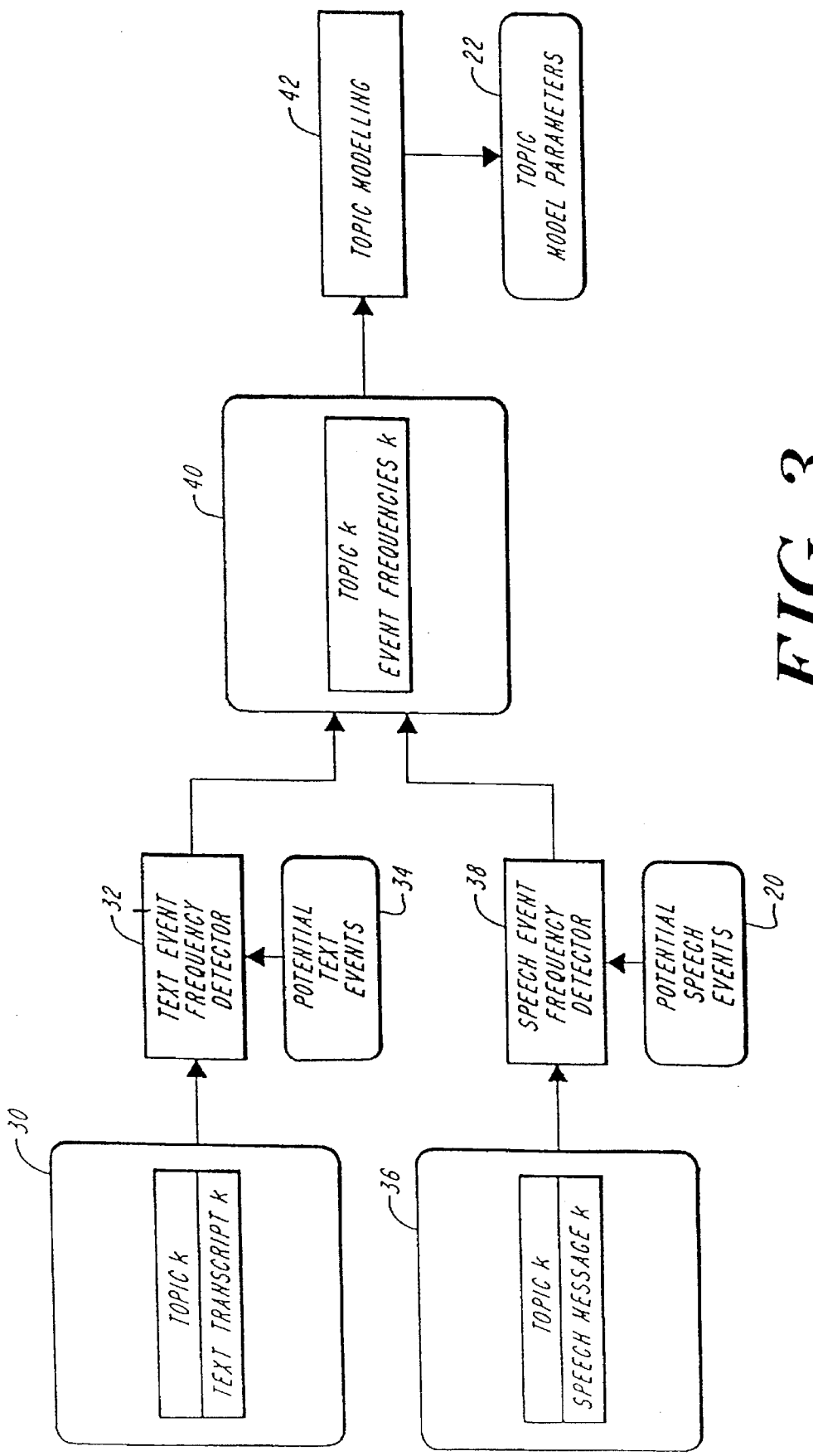
FIG. 3 is a block diagram of the components that are used to train the system of FIG. 1, i.e., how to develop the model parameters of the FIG. 1 system.

Block diagrams of an improved topic discriminator according to the invention and its development are shown in FIGS. 1, 2 and 3.

FIG. 1 is a block diagram of the components that are used to process a spoken message, or other speech data input, indicated at 10, and ultimately produce the topic classifier output 18. The spoken message 10 is processed by a speech event frequency detector 12, which in turn is coupled to a predetermined set of potential speech events 20, e.g., a vocabulary of predetermined words and phrases. The speech event frequency detector produces a signal representative of a set of event frequencies 14 for the potential speech events. The potential speech events 20 can include individual words, multiword phrases, and complex phrases specified in a form such as a regular expression or a context-free grammar. The event frequencies are preferably estimates of the frequency of occurrence of the potential speech events in the spoken data. The speech event frequency detector preferably includes a speech recognizer or word and phrase spotter. The frequency of occurrence of the specified potential speech events is determined by processing the output of the speech recognizer or word spotter although such processing could be integrated into the speech recognizer or word and phrase spotter. The event frequencies are processed by the topic classifier 16 to produce the topic classifier output 18. The output can take the form of a choice from a preselected set of known topics see (FIG. 2A) a choice of either presence or absence of a particular known topic (see FIG. 2B), or a confidence score that a particular known topic is present (see FIG. 2C). The topic classifier 16 makes use of topic model parameters 22 that are determined during a prior, or potentially ongoing, training procedure.

FIG. 3 is a block diagram of the primary components used in the training procedure for training the system of FIG. 1. The input to the training procedure is either or both a transcribed training data 30 and untranscribed speech data 36. Transcribed training data corresponds to a set of text sequences each identified with the true topic. Untranscribed speech data corresponds to a set of recorded messages each labeled with its true topic but which are otherwise unannotated.

In the case where transcribed training data is available as indicated at output 40, each text sequence, provided from the transcribed training data 30, is converted into a set of event frequencies using the text event detector 32. For each of a set of potential text events 34, the text event detector scans the text and determines the frequency of occurrence of that event. As is the case with the potential speech events 20, potential text events can include individual words, multi-word phrases, and complex phrases specified in a form such as a regular expression or a context-free grammar.

In the case where untranscribed speech data is available at 36, as indicated by the output 40, each speech data sequence is processed using the speech event frequency detector 38 into a set of event frequencies in the same manner as will be used for new unknown topic messages using the speech event detector 12 shown in FIG. 1.

Figure 4:
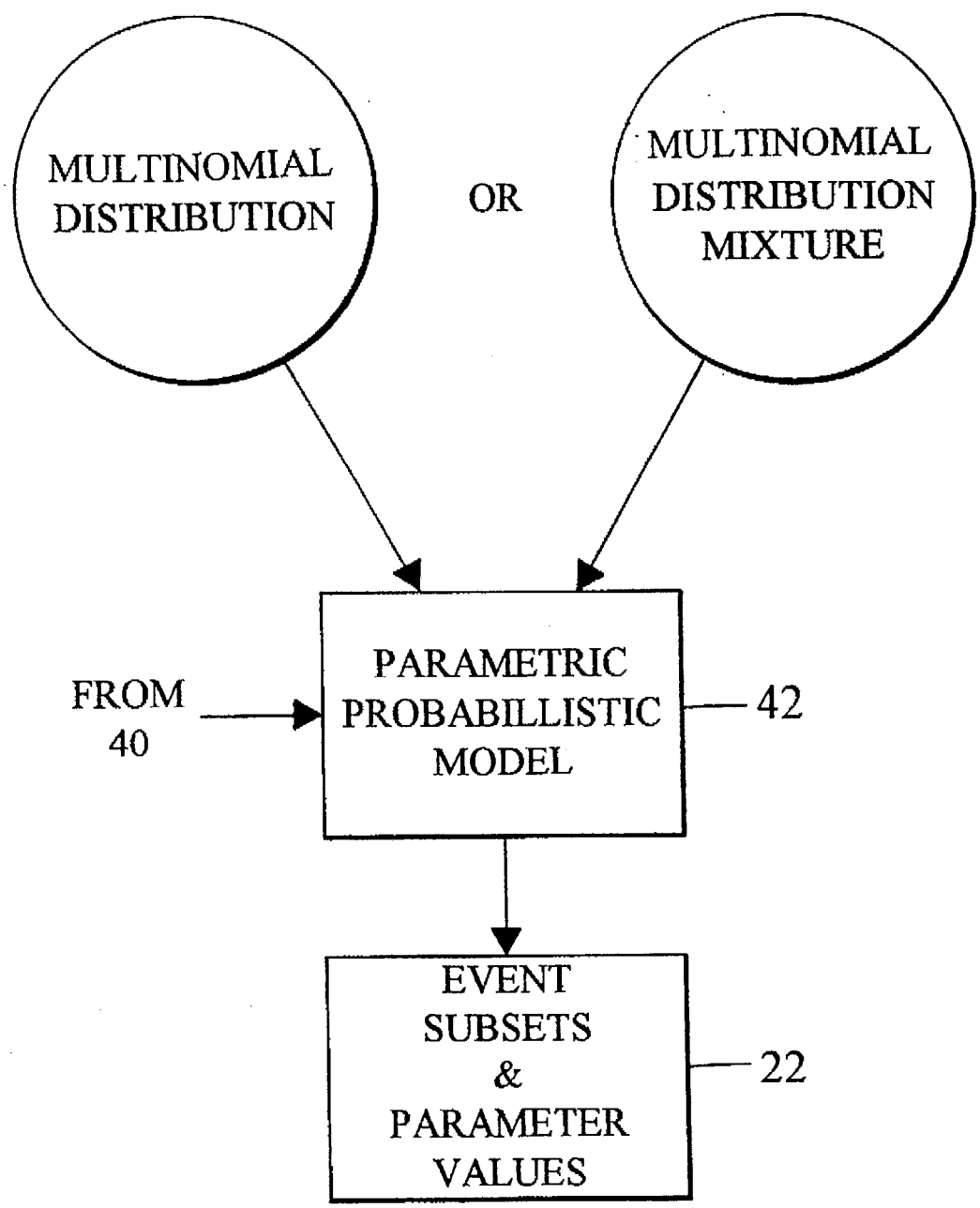
FIG. 4 shows a preferred embodiment of the topic modeling component shown in FIG. 3.

The topic modeling component 42 uses as input the output 40 representative set of event frequencies along with the true topic labels. In the preferred embodiment shown in FIG. 4, topic modeling comprises first selection of a subset of the available events. Then, parametric probabilistic models for the event frequency of each of the selected events are estimated. In the preferred embodiment, the parametric models take the form of multinomial distributions or mixtures of multinomial distributions, although other distributions can be used as described in greater detail hereinafter. The topic model parameters 22 are then comprised of the selected subsets of events and the parameter values for the individual event frequency distributions.

Figure 5:
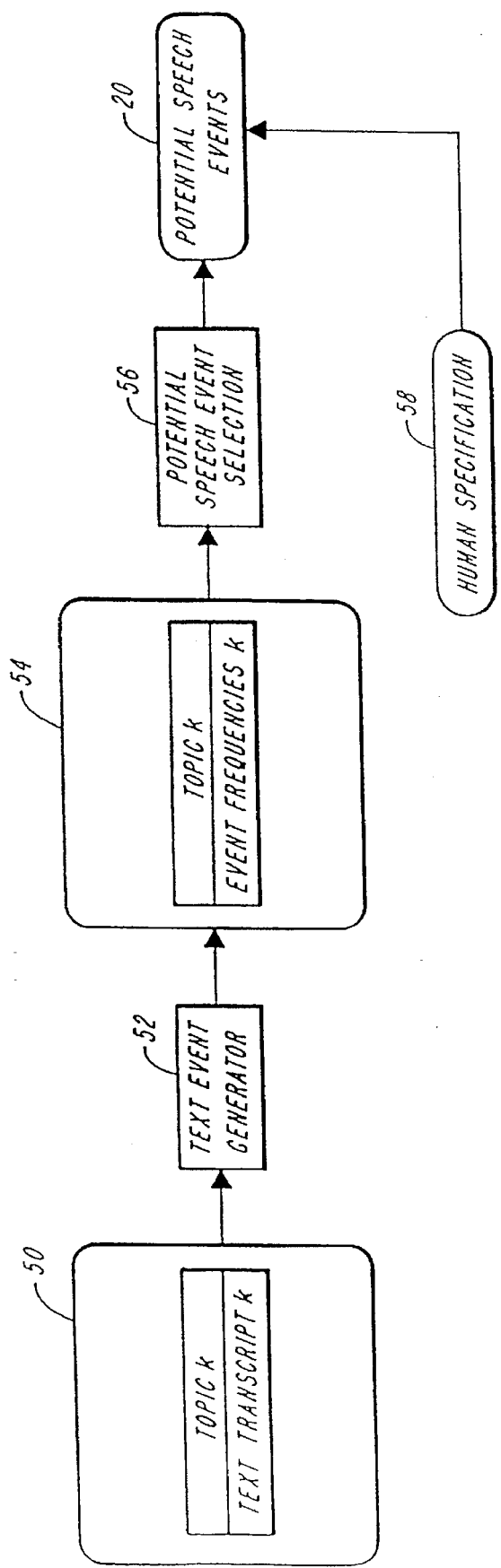
FIG. 5 is a block diagram of further components that are used in a preliminary phase of training, i.e., how one obtains the potential speech events.

FIG. 5 is a block diagram of further components that are used in a preliminary phase of training to determine the potential speech events 20. The set of potential speech events can be provided as an input to the system based, for example, on a human specification 58. Alternatively, the set of potential speech events can be determined from a set of transcribed text data 50. Note that the transcribed training data 50 can be distinct from the transcribed training data 30, shown in FIG. 2, used in the training of the topic classifier. When text data is used, a text event detector 52 is used to generate at output 54 a signal representative of event frequencies from which the set of potential speech events 20 is selected by the potential speech event selector 56.

Event Frequency Detectors

The speech event frequency detectors 12 and 38 of FIGS. 1 and 3, which are used either in processing new speech data or in training the system, are each designed to extract relevant features from the speech data. These features are the estimated frequency of occurrence of each event of a selected set of events.

Events include presence of individual words, multiword phrases, and complex phrases specified in a form such as a regular expression or a context-free grammar. An example of a multiword phrase would be "credit card" or a brand name card such as "American Express". An example of a complex phrase would be a syntactically correct flight identification in an air-traffic-control command, or a time including any form such as "twelve o3 clock", "noon", or "five minutes to ten."

Each event frequency detector 12 and 38 can be constructed hypothesized string of events and then computing the event frequencies from the string of events. In this form of event frequency detector, the hypothesized string can be a hypothesized word sequence produced by a speech recognizer, a set of putative word or phrase occurrences produced by a word spotter, or a set of putative word or phrase occurrences with associated confidence scores. The event frequencies can be computed by simple counting of words in the case of the speech recognizer (see FIG. 6A), by counting putative word and phrase events or by combining (e.g., summing) the confidence scores in the case of the word and phrase spotter (see FIGS. 6B and 6C), or by first detecting phrases in the word sequence (i.e., parsing) produced by the speech recognizer followed by counting the number of word and phrase events (see FIG. 6D). Other related techniques for generating speech events are also possible, as well as integrating the counting of combination steps directly into the speech recognition or word spotting phases.

In a preferred embodiment of the event frequency detector shown in FIG. 7, a hidden Markov model (HMM) based word and phrases spotter is used. Confidence scores which are probabilities of occurrence of the putative words and phrase are computed using the techniques described in Rohlicek, et al. (1989) (J. R. Rohlicek, W.Russell, S. Roukos, and H. Gish; "Continuous Hidden Markov Modeling for Speaker-Independent Word Spotting", IEEE ICASSP, 1989, pp. 627–630), Rohlicek, et al. (1993) (J. R. Rohlicek, P. Jeanrenaud, K. Ng, H. Gish, et al. "Phonetic Training and Language Modeling for Word Spotting" IEEE ICASSP, 1993, volume II, pp. 459–462), and Jeanrenaud, et al., (1993) (P. Jeanrenaud, M. Siu, K. Ng. R. Rohlicek, and H. Gish; "Phonetic-based Word Spotter: Various Configurations and Application to Event Spotting"; in ESCA Eurospeech, 1993, Volume II, pp 1057–1060). Summing of these scores for each event over the speech data directly provides the expected number of occurrences of the event given the data.

In the cited approaches to word spotting, the scoring statistic computed is either the probability of ending a keyword at time t given input data up to that time $O_1, \ldots, O_t$, or else the probability of ending the keyword given all the data in the message up to the ending time T. The former is computed as:

$$p(w,t) = \frac{\alpha(e_w,t)}{\Sigma \text{ all states } s^{\alpha(s,t)}} \quad (1)$$

wherein $e_w$ is the last state of the keyword and c is defined as:

$$\alpha(s,t) = P(\text{state at } t=s, O_1, \ldots, O_t) \quad (2)$$

and can be computed using a well-known interation, e.g., L. R. Rabiner in Readings in Speech Recognition, pp. 267–296, A Waibel, 2nd, K. F. Lee (eds.) 1990.

The latter probability is computed as $$p(w,t) = \frac{\alpha(e_w,t)\beta(e_w,t)}{\Sigma \text{ all states } s^{\alpha(s,t)\beta(s,t)}} \quad (3)$$

wherein $\beta$ is defined as:

$$\beta(s,t) = P(O_{t+1}, \ldots, O_T | \text{state at } t=s) \quad (4)$$

and can be computed with another well-known iteration.

The probability of a phrase event is computed in the same manner except that the end state $e_w$ is replaced with the ending state of a subnetwork allowing all valid word sequences for the phrase.

Using these score definitions, the estimate of the number of occurrences of a word or phrase can be obtained by summing over time as follows:

$$n(w) = \Sigma_t p(w,t) \quad (5)$$

In the case where p(w,t) is computed from the $\alpha$ and $\beta$ terms, n(w) is the conditional expectation of the number of occurrences given all the data $O_1, \ldots, O_T$.

The potential speech events can be used to configure the speech recognizer or word and phrase spotter so that these events are reported in the hypothesized event string.

Topic Model Training

Topic model training as shown in FIG. 3 is composed of two steps. First, a subset of events are selected. Second, probabilistic models for the event frequencies, conditional on the topic, are estimated. The second step, topic modeling, is described first followed by the event selection step.

Topic Modeling

Topic modeling is the process of constructing a probability model for the word or event occurrence patterns observed in speech messages about a given topic. In order to provide a basis for distinguishing between or amongst topics, one such probability model is trained for every topic in a known set; optionally, a "background" topic may be defined so as to include the universe of topics not of interest to the potential user. These models are trained using a set of word occurrence statistics that vary according to the specific topic on which they are based. Such word occurrence statistics can be derived from text transcriptions indicated at 30 in FIG. 3, where each transcription corresponds to a speech message in a training set. Alternatively, such occurrence statistics can be derived from the output of event detector 38 when the speech messages 36 in the training set are used as input. Generally, the second method is to be preferred, as it has proven more effective in capturing the specific characteristics of both the input speech, and the event detector that comprises one component of the topic discrimination system.

There are several classes of probability models that have proven effective in the topic modeling application. One preferred class is predicated on an independent, identically-distributed (i.i.d.) assumption about the words or events observed in an event sequence w, and issues in a multinomial model. As illustrated in FIG. 8, the resulting sequence-likelihood, as conditioned on topic $T_i$, can be expressed as:

$$\log P(w|T_i) = \sum_{k=0}^{K} \frac{n_k}{N} \log p_k(T_i) \quad (6)$$

where $n_k$ is the number of times event $v_k$ is hypothesized or observed in sequence W;

$$N = \sum_{k=0}^{K} n_i$$

is the total number of events observed in w; and $p_k(T_i)=P(V_k|T_i)$ is the probability of the occurrence of event $v_k$ conditioned on topic $T_i$. It is the set of event occurrence probabilities $\{p_k(T_i)\}_{k=0}^{K}$ that must be estimated using either text transcriptions of training messages, or the output of an event detector corresponding to such messages. To provide for a non-exhaustive event set V, the out-of-vocabulary (OOV) event, $v_0$, which denotes the occurrence of "none of the above," is assigned probability $$1 - \sum_{k=1}^{K} p_k(T_i)$$

and included in event vocabulary V. Topic identification can then be performed on speech message w by finding that topic $T_i^*$ which maximizes equation (6).

Figure 9:
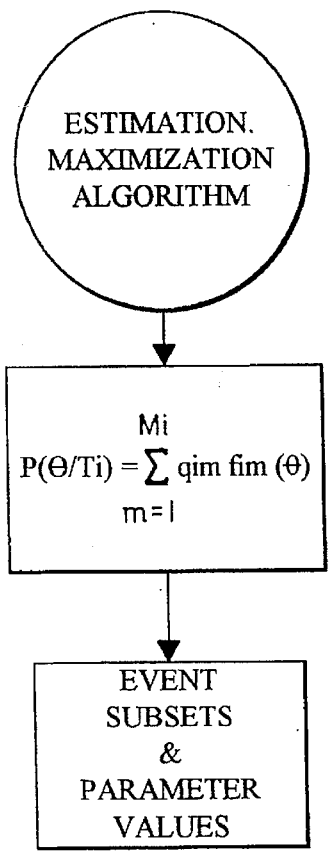
FIG. 9 shows at least one alternative of a multi-nomial topic model.
Figure 10:
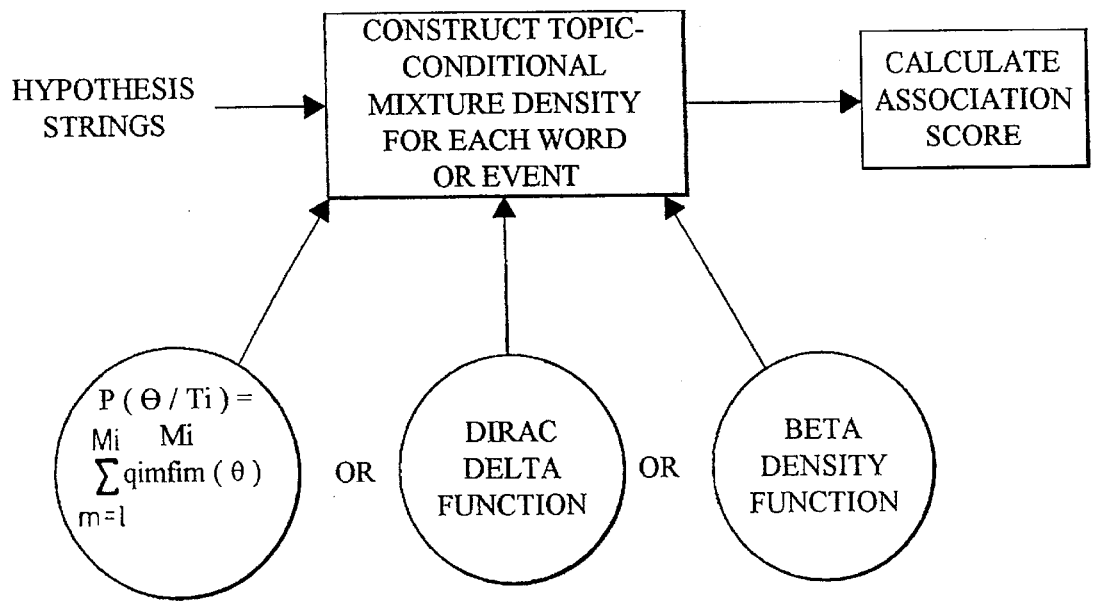
FIG. 10 shows a preferred embodiment for deriving word or event frequency statistics from hypothesis strings using either the weighted sum of delta-dirac functions, or the weighted sum of beta density functions.

A second class of preferred topic models illustrated in FIGS. 9 and 10; and is that based on a multi-nomial topic model, in which the event occurrence probabilities $\theta_k = P(V_k)$ are not assumed to be known or deterministic, but rather are represented with a probabilistic mixture density. For the complete vector of occurrence parameters, $\theta = \{\theta_k\}_{k=0}^{K}$, the topic-conditional mixture density can be expressed as $$P(\theta|T_i) = \sum_{m=1}^{M_i} q_{im} f_{im}(\theta) \tag{7}$$

where $q_{im}$ is the prior probability of the selection of mixture m conditioned on topic $T_i$, $f_{im}(\theta)$ is the conditional multivariate probability density function of $\theta$; and $M_i$ is the total number of mixtures associated with topic $T_i$. When the mixture density of equation (7) is used in conjunction with the multi-nomial model of equation (6), the resulting sequence likelihood can be expressed as $$\log P(w|T_i) = \log \int_\theta \ldots \int \prod_{k=0}^{K} \theta_k^{n_k} \left( \sum_{m=1}^{M_i} q_{im} f_{im}(\theta) \right) d\theta \tag{8}$$

As shown in FIG. 10, two preferred density functions $f_{im}(\theta)$ are the Dirac delta function, and the beta-density function, given by $$f_{im}(\theta) = \frac{1}{C(n_{im}^{(0)}, n_{im}^{(1)}, \ldots, n_{im}^{(K)})} \prod_{k=0}^{K} \theta_k^{(k)}_{im} \tag{9}$$

where $C(n_{im}^{(0)}, n_{im}^{(1)}, \ldots, n_{im}^{(k-)})$ is a nomalization constant chosen to ensure $f_{im}(\theta)$ is a proper density function.

Both such densities are well-own to those skilled in the art (see, for example, Alexander M. Mood and Franklin A. Graybill, *Introduction to the Theory of Statistics*, McGraw-Hill, N.Y., N.Y., 1950). The parameters associated with mixture densities such as that represented in equation (7) can be estimated using the Estimation-Maximization algorithm as indicated in FIG. 9, which is also well-known to those skilled in the art (see, for example, A. P. Dempster, N. M. Laird and D. B. Rubin, "Maximum Likelihood from Incomplete Data via the EM Algorithm," Journal Royal Statistical Society, Series B, 39:1–38,1977).

Speech Event Subset Selection

The prior art has taught that all events should be used in the development and training of a topic discrimination system. While this may be the case in some instances, in accordance with the teachings of the present invention improved performance is often obtained by restricting the set of events considered relevant to a topic. Hence, event selection is necessary to determine the subset of words or other acoustic events which, when observed or hypothesized in a speech message, best serve to indicate the topic membership of that message. As indicated in FIG. 3, this type of selection can be made on the basis of either text transcriptions of speech messages or the output produced by an event detector when such speech messages are taken as input. The latter method is generally preferred for reasons given previously.

Figure 11:
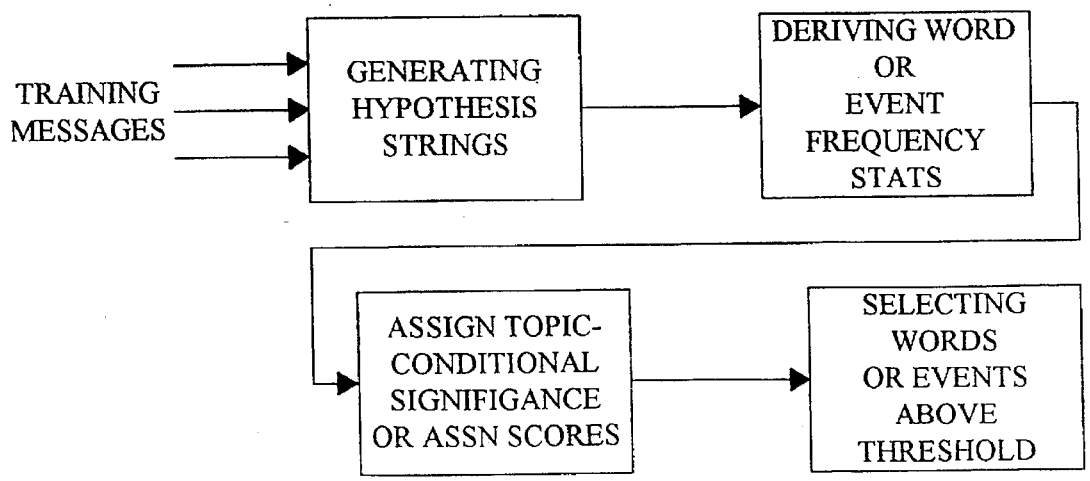
FIG. 11 shows a preferred embodiment of event selection that is founded on the concept of hypothesis testing.
Figure 12:
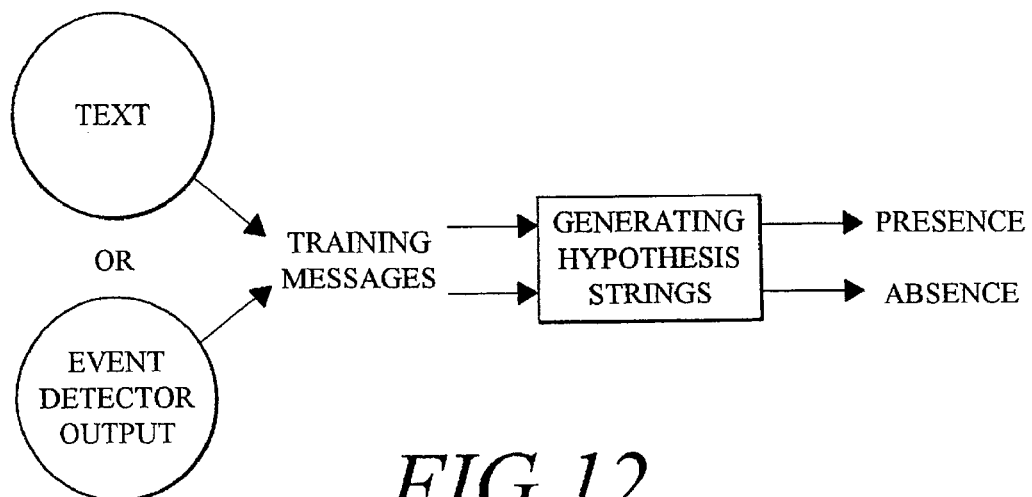
FIG. 12 shows a preferred embodiment of generating hypothesis strings so that each indicates only the binary-valued presence or absence of a word or event.

One preferred method of event selection (shown in FIG. 11) is founded on the concept of hypothesis testing. According to one aspect of the invention, (as shown in FIG. 12) hypothesis testing is used to determine whether or not there is sufficient evidence to establish that the occurrence pattern for a given keyword or event is dependent on the topic membership of the speech messages in which the event is observed. If such a dependence is established, the event is assumed to be a good indicator of topic membership. The $X^2$-test is well-known in the art (see Alexander M. Mood and Franklin A. Graybill, *Introduction to the Theory of Statistics*, McGraw-Hill, N.Y., N.Y., 1950) and useful for testing dependencies of this type.

One possible formulation of the $X^2$-test makes use of contingency tables of the type, shown in FIGS. 13A and 13B. To implement the test or analysis, a table is constructed for each candidate word or event by first determining how frequently it appears in either the text transcripts or event detector output associated with each speech message, and then "binning" the messages according to this frequency. Hence, each cell of the contingency table contains the number of speech messages, drawn from a topic or set of topics, for which the candidate word or event was observed to occur within a specified frequency range. Two variations on the analysis are introduced by the manner in which the messages from each topic are grouped. In the table of FIG. 4a, each topic is allotted its own row and the relevance of each word is tested across all topics simultaneously. This is referred to as the All-Against-All (AAA) test. In the table of FIG. 4b, a single topic (i.e., the topic of interest) is allotted the first row and the remaining topics are grouped together in the second. The final keyword set in this variation, which is referred to as Topic-Against-All-Other (TAO) test, is comprised of the union of all keyword subsets, each of which is chosen by designating a different topic as the topic of interest. Once a contingency table has been constructed, the corresponding $X^2$ value can be determined in the following manner. The number of conversations $N_{ij}$ assigned to cell (i,j) is found for each cell in the table and these conversation counts are used to find the row and column totals $$N_{i \cdot} = \sum_j N_{ij} \tag{10}$$

and $$N_{\cdot j} = \sum_i N_{ij} \tag{11}$$

respectively. The $X^2$-value is then provided by $$x^2 = \sum_{i,j} \frac{(N_{ij} - n_{ij})^2}{n_{ij}} \tag{12}$$

where $$n_{ij} = \frac{N_i N_j}{n_{ij}}$$

is the expected number of counts for each cell.

The raw $X^2$ statistic can be converted into a corresponding significance value by means well-known in the art (see, for example, William H. Press, Saul A. Teukolsky, et al, *Numerical Recipes in C: The Art of Scientific Computing*, Cambridge University Press, Cambridge, England, 1992). Event selection is accomplished by considering as relevant all those words or events whose significance values exceed a predefined threshold.

Figure 14:
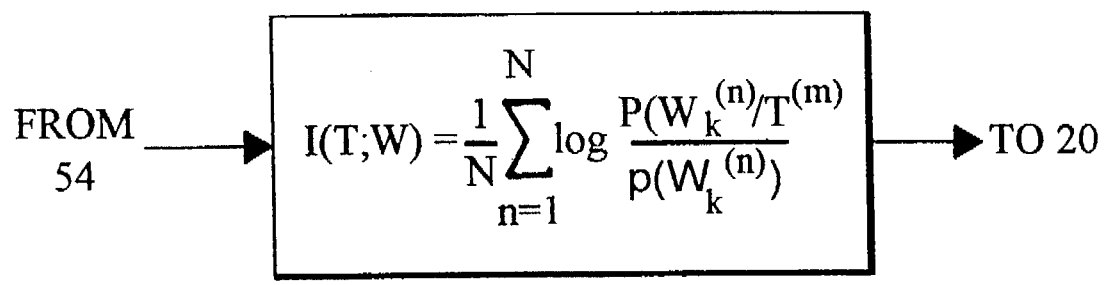
FIG. 14 shows a preferred embodiment of determining the association score, for use in a topic discriminator according to the invention.

A second preferred method for event selection shown in FIG. 14 is based on the determination of a mutual information measure between the ensemble of event occurrences and the ensemble of message topic membership. Such measures are well-known in the art (see Thomas M. Cover and Joy A. Thomas, *Elements of Information Theory*, John Wiley and Sons, N.Y., N.Y., 1991). The desired mutual information measure I(T,W) can be expressed as $$I(T;W) = \frac{1}{N} \sum_{n=1}^{N} \log \frac{p(w_k^{(p)}|T^{(n)})}{p(w_k^{(p)})} \quad (13)$$

where $p(w_k^{(n)}|T^{(n)})$ is the likelihood of the occurrence pattern for word or event $v_k$ observed in training sequence $w^{(n)}$ conditioned on its true topic $T^{(n)}$, and $$p(w_k^{(p)}) = \sum_T p(w_k^{(p)}|T)p(T)$$

is the likelihood for the same occurrence pattern independent of topic. The topic-conditional sequence likelihoods $p(w_k^{(n)}|T^{(n)})$ can be estimated by resorting to any of the probability models previously discussed; a preferred method makes use of the multi-nomial model in combination with an event occurrence probability characterized by a mixture density.

A third preferred method for event selection employs a Kullback-Liebler distance measure. Such a distance measure is well-known in the art (see, for example, (see Thomas M. Cover and Joy A. Thomas, *Elements of Information Theory*, John Wiley and Sons, N.Y., N.Y., 1991) and provides a measure of the dissimilarity of the occurrence patterns of an event for a given topic, as opposed to all other topics. The Kullback-Liebler distance can be estimated according to $$D(p(w_k T) \| p(w_k \tilde{T})) = \quad (14)$$

$$\frac{1}{N(T)} \sum_{w_k^{(n)}: T^{(n)}=T} \log \frac{p(w_k^{(p)}|T)}{p(w_k^{(p)}|\tilde{T})} -$$

$$\frac{1}{N(\tilde{T})} \sum_{w_k^{(n)}: T^{(n)} \neq T} \log \frac{p(w_k^{(p)}|T)}{p(w_k^{(p)}|\tilde{T})}$$

where N(T) is the total number of conversations or messages relating to the topic of interest, and $N(\tilde{T})$ is the number relating to all other topics.

In this instance, as in the previous, the topic-conditional sequence likelihoods $p(w_k^{(n)}|T^{(n)})$ can be estimated using any of the probability models previously mentioned.

Potential Speech Event Selection

Before an acoustic event detector can be constructed, some initial set of possible words or events must be defined. This is necessary as these words or events must be modeled in the internal structure of the event detector. Such an initial selection can be accomplished in a number of ways. One preferred method is represented schematically in FIG. 5 by boxes 50, 52, 54 and 56. It entails using any of the previously discussed techniques for selecting keywords, taking as input some small initial set of text transcriptions of speech messages. From these latter, all word frequency statistics needed to conduct hypothesis tests or calculate distance metrics can be extracted.

According to another preferred method of initial event selection, additional keywords or events corresponding to generic phrases may be selected by a human operator. This process is illustrated by box 58 of FIG. 3. A generic phrase refers to a segment of speech that can be described by a formalized grammar. Examples of generic phrases are a phone number, a dollar amount, a date, and a time. Each generic phrase encompasses a large class of specific phrases. For example, a dollar amount might include the specific phrases "five dollars and ten cents" and "twenty-two dollars and thirty cents." Another way to define a generic phrase is to enumerate every specific phrase in a generic category. For example, the generic phrase "dog breeds" could encompass a prescribed set of different kinds of dogs. Recent advances in the art (Jeanrenaud et al) provide for the construction of event detectors capable of modeling and detecting such generalized phrases.

The present invention can be used for sorting speech data in any one of a number of applications. For example, in addition to classifying recordings of air-traffic control dialogs, other examples include sorting of speech data, such as radio news recordings, by the topic of the news story. This type of sorting can be used for automatic detection of speech data of interest or can be used as part of an automatic indexing mechanism for improved access to audio archives. Still other examples include automatic response to or routing of phone calls based on the topic or subject matter in a spoken message from the caller. Still other applications similar to the automatic indexing and data detection applications described above include classification of stored or incoming voice messages in a voice mail system.

The topic discriminator of the present invention thus addresses situations for which the prior art is not applicable; and provides substantially improved topic discrimination performance compared to the above-noted prior art techniques. The topic discriminator of the present invention is capable of working when little or no transcribed training data is available for the topic modeling component of the discriminator; is capable of being used is situations in which user feedback is undesirable or impossible, such as when using prerecorded speech data; and can use the occurrence of complex phrases, for example any dollar amount, in addition to words or simple word sequences as input events on which to base topic discrimination decisions. The performance of a topic discriminator is improved by making direct use of confidence scores from a word or phrase spotter, rather than using binary detection decisions or hypothesized transcriptions, and by using these scores to derive an expected number of occurrences for every event in a given set. In using the topic discriminator of the present invention, it allows one to determine a set of potential speech events to be detected by the text event detector of a topic discriminator using transcribed training data if it is available.

Since certain changes may be made in the above apparatus and method, without departing from the scope of the invention herein involved, it is therefore intended that all matter contained in the above description or shown in the accompanying drawings shall be illustrative and not in a limiting sense.

What is claimed is:

1. A method of selecting a vocabulary of important keywords or speech events, the presence or absence of which in a hypothesis string associated with a speech message serves to indicate the topic membership of the message, said method comprising the steps of:

generating hypothesis strings in response to and as a function of a plurality of training messages produced from the output of an event detector, each of said training messages being known to be about one of a finite set of topics;

deriving word or event frequency statistics from said hypothesis strings;

assigning topic-conditional significance or association scores to all possible words or events as a function of the word or event frequency statistics; and selecting those words or events having topic-conditional significance or association scores above a predetermined threshold.

2. The method according to claim 1, wherein said step of generating said hypothesis strings in response to and as a function of the plurality of training messages produced from the output of the event detector includes the step of generating said hypothesis strings so that each indicates only the binary-valued presence or absence of a word or event.

3. The method according to claim 2, wherein said step of generating said hypothesis strings in response to and as a function of the plurality of training messages includes the step of deriving said hypothesis strings from a text transcription of the speech message produced from the output of the event detector.

4. The method according to claim 2, wherein said step of generating said hypothesis strings in response to and as a function of the plurality of training messages includes the steps of (a) obtaining said hypothesis strings by applying the speech messages to the input of the event detector of the type providing a hypothesis string output in response to a speech message; and (b) detecting the output of the event detector.

5. The method according to claim 4, wherein the event detector is a speech recognizer and said step of detecting the output of the event detector includes the step of detecting the output of said speech recognizer.

6. The method according to claim 1, wherein said step of generating hypothesis strings in response to and as a function of the plurality of training messages includes the step of generating each hypothesis string so that said hypothesis string includes a probability or confidence score for every word or event in the string, said score indicating the overall likelihood the word or event occurred in the actual speech message associated with the string.

7. The method according to claim 6, wherein said step of generating hypothesis strings in response to and as a function of the plurality of training messages includes the steps of (a) generating said hypothesis strings by applying the speech messages to the input of an event detector of the type providing hypothesis strings and associated word or events scores in response to speech messages; and (b) detecting the output of the event detector.

8. The method according to claim 1, wherein the event detector is a word or event spotter and said step of detecting the output of the event detector includes the step of detecting the output of said word or event spotter.

9. The method according to claim 1, wherein said step of deriving word or event frequency statistics from said hypothesis strings includes the step of counting the number of keyword or event occurrences in the hypothesis strings.

10. The method according to claim 1, wherein said step of deriving word or event frequency statistics from said hypothesis strings includes the step of obtaining said word-frequency statistics by summing the confidence scores for all words or events in the hypothesis strings.

11. The method according to claim 1, wherein said step of assigning topic-conditional significance or association scores to all possible words or events includes the step of obtaining topic-conditional significance or association scores by a hypothesis test.

12. The method according to claim 11, wherein said hypothesis test is a chi-squared test, and the step of obtaining topic-conditional significance or association scores by said chi-squared test includes the step of calculating the chi-squared ($X^2$) values as follows:

$$x^2 = \sum_{i,j} \frac{(N_{ij} - n_{ij})^2}{n_{ij}}$$

and storing said chi-squared values in a table having cells defined by i rows and j columns;

wherein $$n_{ij} = \frac{N_i N_j}{n_{ij}}$$

is the expected number of counts for each cell;

$$N_i = \sum_j N_{ij};$$

$$N_j = \sum_i N_{ij}; \text{ and}$$

$N_{ij}$ equals the number of conversations assigned to cell (i,j) found for each cell in the table.

13. The method according to claim 12, wherein said step of obtaining topic-conditional significance or association scores by a chi-squared test includes the step of generating at least one contingency table from the word-frequency statistics derived from the message hypothesis strings and basing said chi-squared test on said contingency tables.

14. The method according to claim 13, wherein each topic is allotted its own row in the contingency table and said step of obtaining topic-conditional significance or association scores by a chi-squared test includes the step of conducting a hypothesis test across all topics simultaneously.

15. The method according to claim 13, wherein a single topic is allotted its own row in the contingency table while all other topics are grouped together in a second row of said table, and said step of obtaining topic-conditional significance or association scores by a chi-squared test includes the step conducting said chi-squared test for only a single word and topic at a time.

16. The method according to claim 1, wherein said step of deriving word or event frequency statistics from said hypothesis strings includes the steps of (a) using said word or event frequency statistics to construct topic-conditional mixture densities for each possible word or event, and (b) using said topic-conditional mixture densities to calculate an association score for each word.

17. The method according to claim 16, wherein the mixture have the form of:

$$P(\theta|T_i) = \sum_{m=1}^{M_i} q_{im} f_{im}(\theta)$$

wherein $T^i$ is one of i topics;

$q_{im}$ is the prior probability of the selection of mixture m conditioned on topic $T_i$;

$f_{im}(\theta)$ is the conditional multi-variate probability density function of $\theta$; and $M_i$ is the total number of mixtures associated with topic $T_i$.

18. The method according to claim 17, wherein said mixture densities are comprised of the weighted sum of delta-dirac functions.

19. The method according to claim 17, wherein said mixture densities are comprised of the weighted sum of beta-density functions of the form:

$$f_{im}(\theta) = \frac{1}{C(n_{im}^{(0)}, n_{im}^{(1)}, \ldots, n_{im}^{(K)})} \prod_{k=0}^{K} \theta_{k,im}^{(k)}$$

wherein $C(n_{im}^{(0)}, n_{im}^{(1)}, \ldots, n_{im}^{(K)})$ is a normalization constant chosen to ensure $f_{im}(\theta)$ is a proper density function.

20. The method according to claim 19, wherein further including the steps of estimating the parameters of said mixture densities with an Estimation-Maximization algorithm.

21. The method according to claim 19, wherein said association score is a mutual information measure occurrences and that of topic membership, wherein the desired mutual information measure I(T,W) can be expressed as:

$$I(T;W) = \frac{1}{N} \sum_{n=1}^{N} \log \frac{p(w_k^{(n)}|T^{(n)})}{p(w_k^{(n)})}$$

where $p(w_k^{(n)}|T^{(n)})$ is the likelihood of the occurrence pattern for word or event $v_k$ observed in training sequence $w^{(n)}$ conditioned on its true topic $T^{(n)}$, and $$p(w_k^{(n)}) = \sum_T p(w_k^{(n)}|T)p(T)$$

is the likelihood for the same occurrence pattern independent of topic.

22. The method according to claim 19, wherein said association score is a Kullback-Liebler distance between the probability density of the word conditioned on a given topic, and the density of the word conditioned on all other topics, said distance measure having the form:

$$D(p(w_k T)\|p(w_k \tilde{T})) =$$

$$\frac{1}{N(T)} \sum_{w_k^{(n)}:T^{(n)}=T} \log \frac{p(w_k^{(n)}|T)}{p(w_k^{(n)}|\tilde{T})} -$$

$$\frac{1}{N(\tilde{T})} \sum_{w_k^{(n)}:T^{(n)}\neq T} \log \frac{p(w_k^{(n)}|T)}{p(w_k^{(n)}|\tilde{T})}$$

where N(T) is the total number of conversations or messages relating to the topic of interest, and $N(\tilde{T})$ is the number relating to all other topics.

* * * * *

UNITED STATES PATENT AND TRADEMARK OFFICE
CERTIFICATE OF CORRECTION

PATENT NO. : 5,625,748
DATED : April 29, 1997
INVENTOR(S) : John W. McDonough, et al.

It is certified that error appears in the above-indentified patent and that said Letters Patent is hereby corrected as shown below:

Claim 17, column 14, line 67, after "mixture" insert -- densities --;
Claim 22, column 16, line 21, after "k" insert --|--

Signed and Sealed this

Fourteenth Day of October, 1997

Attest:

BRUCE LEHMAN

Attesting Officer

Commissioner of Patents and Trademarks